US009824385B2

(12) United States Patent
Ruvini et al.

(10) Patent No.: US 9,824,385 B2
(45) Date of Patent: Nov. 21, 2017

(54) METHOD FOR PERFORMING SEQUENCE LABELLING ON QUERIES

(71) Applicant: eBay Inc., San Jose, CA (US)

(72) Inventors: Jean-David Ruvini, Los Gatos, CA (US); Sunil Mohan, Los Gatos, CA (US); Smruthi Mukund, San Jose, CA (US); Hassan Sawaf, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 389 days.

(21) Appl. No.: 14/584,483

(22) Filed: Dec. 29, 2014

(65) Prior Publication Data

US 2016/0188670 A1    Jun. 30, 2016

(51) Int. Cl.
*G06F 17/30* (2006.01)
*G06Q 30/06* (2012.01)

(52) U.S. Cl.
CPC ... *G06Q 30/0623* (2013.01); *G06F 17/30525* (2013.01); *G06F 17/30604* (2013.01); *G06F 17/30867* (2013.01)

(58) Field of Classification Search
CPC ......... G06F 17/30525; G06F 17/30867; G06F 17/30604; G06Q 30/0623
USPC ....................................................... 707/732
See application file for complete search history.

(56) References Cited

U.S. PATENT DOCUMENTS

| | | | | |
|---|---|---|---|---|
| 2010/0138413 A1* | 6/2010 | Wu | ............... | G06F 17/30867 707/732 |
| 2010/0228762 A1* | 9/2010 | Mauge' | ............ | G06F 17/30672 707/766 |
| 2012/0239519 A1* | 9/2012 | Wu | ............... | G06F 17/30867 705/26.3 |
| 2013/0080423 A1* | 3/2013 | Parikh | ................ | G06Q 30/02 707/722 |
| 2013/0085900 A1* | 4/2013 | Williams | ......... | G06Q 30/0601 705/27.2 |
| 2013/0103672 A1* | 4/2013 | Parikh | ............... | G06F 17/30867 707/717 |
| 2013/0132226 A1* | 5/2013 | Abbas | ............... | G06Q 30/0601 705/26.3 |
| 2013/0215116 A1* | 8/2013 | Siddique | ............ | G06Q 30/0643 345/420 |
| 2014/0025701 A1* | 1/2014 | Zhu | ................. | G06F 17/30389 707/765 |

* cited by examiner

*Primary Examiner* — Robert Stevens
(74) *Attorney, Agent, or Firm* — Shook, Hardy & Bacon L.L.P.

(57) ABSTRACT

A method of propagating annotations of content items to a search query is disclosed. A strength of a correspondence between a search query and a title of a listing of an item on a network-based publication system is determined. The strength of the correspondence is based on an analysis of a set of actions by a set of users who submitted the search query. A set of annotations corresponding to the title is generated. The set of annotations is propagated to an additional search query such that the set of annotations and the strength of the correspondence are used by a search engine to enhance search results corresponding to the additional search query.

20 Claims, 7 Drawing Sheets

METHOD FOR PERFORMING SEQUENCE LABELLING ON QUERIES

TECHNICAL FIELD

The present application relates generally to the technical field of database and file access, and, in one specific example, to improving relevancy of search results based on annotation of search queries.

BACKGROUND

Sequence labeling involves algorithmic assignment of a categorical label to each value of a sequence of observed values. An example of sequence labeling is "part of speech tagging," in which a part of speech is assigned to each word in a series of words (e.g., each word in a sentence of a document).

Sequence labeling may incorporate statistical models, such as the hidden Markov model (HMM), to choose a label for a particular word. In such models, the choice of a label for a particular word may depend on labels chosen for adjacent words.

For example, in a typical sentence of a document, certain words may be unambiguously labeled as having a particular part of speech (e.g., the word "the" may unambiguously be labeled as a determiner), which, in turn may increase or decrease the probability that another word (e.g., to the immediate left or right of the labeled word) may be accurately labeled as belonging to another particular part of speech.

However, the application of such sequence labelling techniques to search queries may be more difficult than applying such labelling techniques to typical sentences used in speech. For example, search queries consist of series of keywords that may or may not form a complete sentence. Thus, it may be more difficult to ascertain the relationship between the keywords to one another.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

A method of propagating annotations of content items to a search query is disclosed. A strength (or degree) of a correspondence between a search query and a title of a listing of an item on a network-based publication system is determined. The strength of the correspondence is based on an analysis of a set of actions by a set of users who submitted the search query. A set of annotations corresponding to the title is generated. The set of annotations is propagated to an additional search query such that the set of annotations and the strength of the correspondence are used by a search engine to enhance search results corresponding to the additional search query.

This method and various embodiments disclosed herein may be implemented as a computer system having one or more modules (e.g., hardware modules or software modules). This method and various embodiments disclosed herein may be embodied as instructions stored on a machine-readable medium that, when executed by a machine, cause the machine to perform the method.

Figure 1:
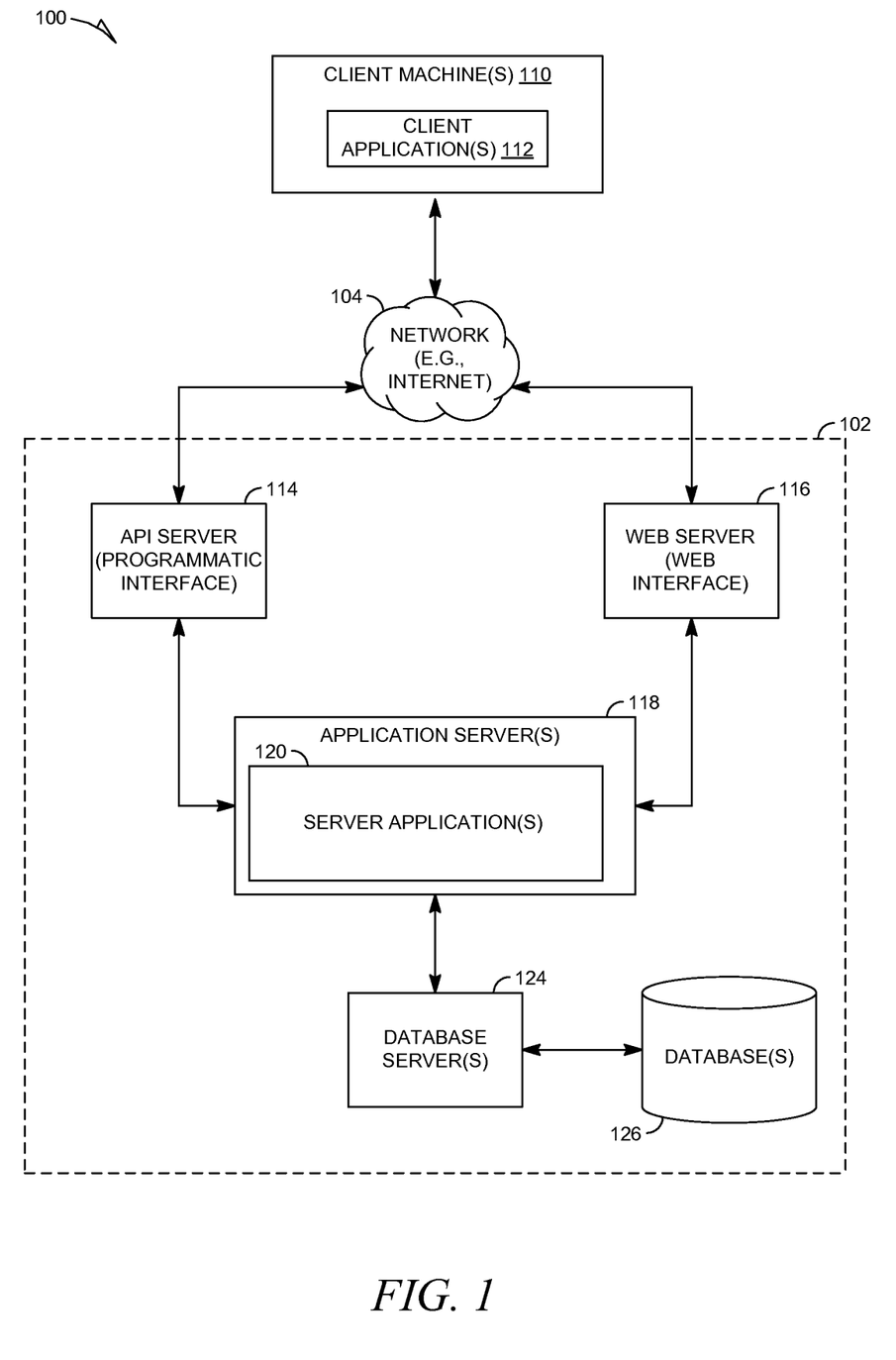
FIG. 1 is a network diagram depicting a client-server system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores, such as NoSQL or non-relational data stores.

The applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
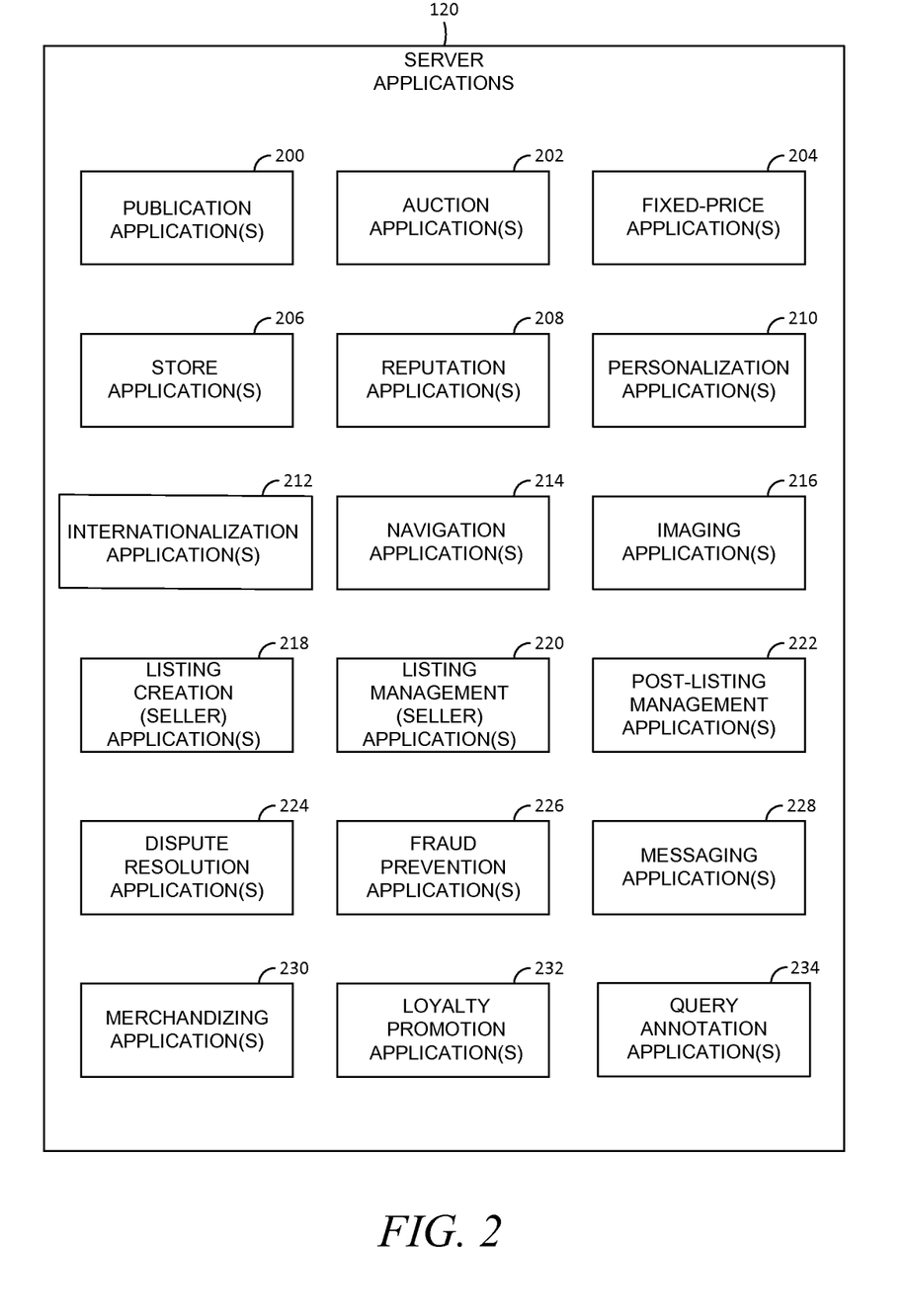
FIG. 2 is a block diagram illustrating multiple server applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular or predetermined seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular or predetermined buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular or predetermined seller, and may be offered a reward for which accumulated loyalty points can be redeemed.

Figure 3A:
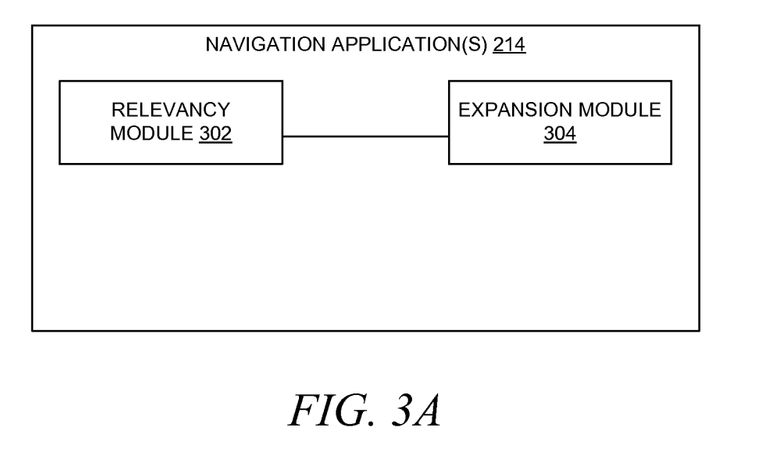
FIG. 3A is a block diagram illustrating example modules of the navigation application(s) 214.

FIG. 3A is a block diagram illustrating example modules of the navigation application(s) 214. A relevancy module 302 may be configured to adjust rankings search result items based on input received from the query-annotation application(s) 234, such as a set of annotations corresponding to a search query and a set of confidences corresponding to the set of annotations, as described in more detail below. An expansion module 304 may be configured to limit expansion of search results to the most relevant search items based the input received from the query-annotations application(s) 234, as described in more detail below.

Figure 3B:
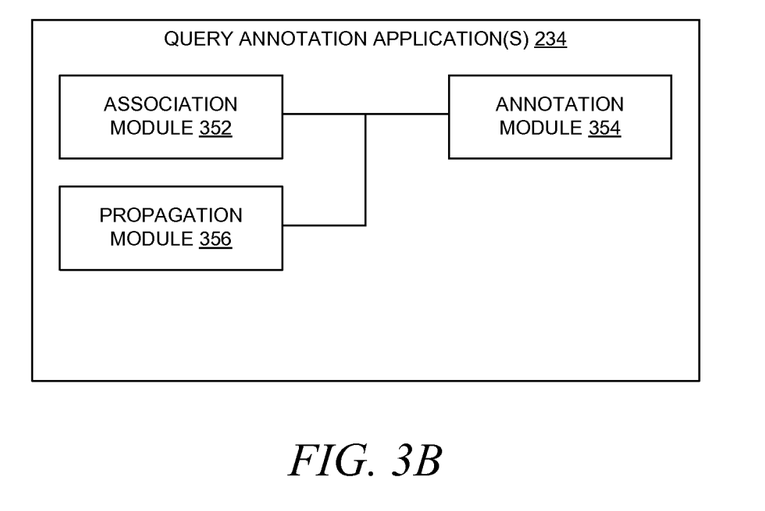
FIG. 3B is a block diagram illustrating example modules of the query annotation application(s) 234

FIG. 3B is a block diagram illustrating example modules of the query annotation application(s) 234. An association module 352 may be configured to associated previously-submitted search queries with previous listings of items on the network-based publication system. An annotation module 354 may be configured to generate annotations for the previous listings items corresponding to the previously-submitted search queries. Additionally, the annotation module 354 may be configured to generate sets of confidences corresponding to the sets of annotations based on an analysis of the previously submitted search queries and the listings, as described in more detail below. A propagation module 356 may be configured to propagate sets of annotations and sets of confidence percentages corresponding to a previously-submitted query onto a newly-submitted query (e.g., at run-time), as described in more detail below.

Figure 4:
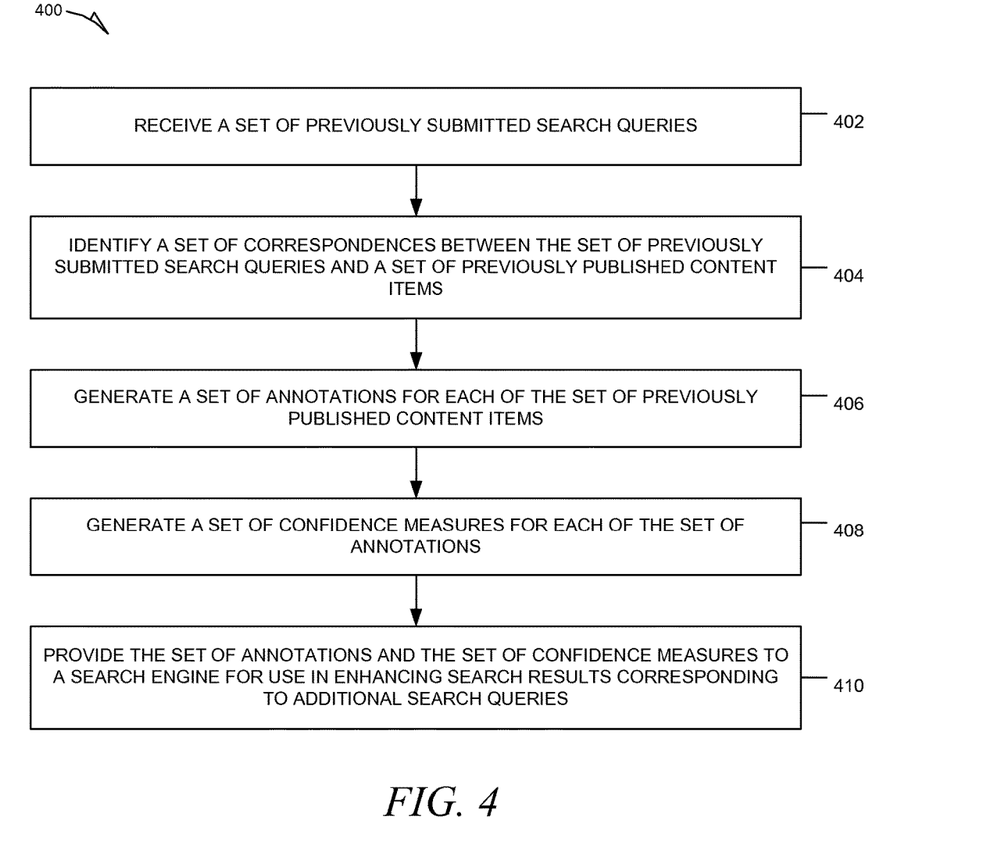
FIG. 4 is a flowchart illustrating example operations of a method of generating set of annotations and sets of confidence measures for propagation onto a search query for enhancing search results corresponding to the search query.

FIG. 4 is a flowchart illustrating example operations of a method 400 of generating set of annotations and sets of confidence measures for propagation onto a search query for enhancing search results corresponding to the search query. In various embodiments, the operations may be performed by one or more modules of the query annotation application(s) 234.

At operation 402, the association module 352 receives a set of previously-submitted search queries. In various embodiments, the search queries may have been entered by users of a network-based publication system who are searching for items listed on the network-based publication system.

At operation 404, the association module 352 identifies a set of correspondences between the set of previously submitted search queries and a set of previously published content items. In various embodiments, the set of correspondences may be based on an action performed by the user with respect to the previously published content item after submitting the search query. For example, if the previously submitted query includes the keywords "red" and "Porsche," and a percentage of the users who submitted the query subsequently perform the action of placing a bid on or purchase a red Porsche automobile, the association module may associate the query with listings featuring red Porsche automobiles on the network-based publication system. Furthermore, if another percentage of the users who submitted the same query place a bid on or purchase a particular paint having a color named "Red Porsche," the association module 352 may also identify an association between the query and listing featuring paint having the "Red Porsche" color.

At operation 406, the annotation module 354 generates a set of annotations for each of the set of previously published content items. For example, for a listing of a red Porsche automobile, the annotation module 354 may generate annotations of "product type=automobile" and "color=red." Or, for a listing of a paint having the "Red Porsche" color, the annotation module 354 may generate annotations of "product type=paint" and "color=Red Porsche."

At operation 408, the annotation module 354 generates a set of confidence measures for each of the sets of annotations. For example, if 90% of the users who enter the query including the keywords "red Porsche" place a bid on or purchase a red Porsche automobile, the annotation module 354 may generate a confidence measure for the set of annotations corresponding to a red Porsche automobile (e.g., "product type=automobile" and "color=red," of 9 on a scale of 0-10. Similarly, if an additional 5% of the users who enter the query place a bid on or purchase paint having the "Red Porsche" color, the annotation module may generate a confidence measure corresponding the red Porsche paint of 0.5 on the scale.

Additionally, the annotation module 354 may assign weightings to each of the sets of confidence measures based on a significance of the actions performed by the users after entering the search query. The significance of the actions may be calculated based on various factors deemed significant by an operator of the network-based publication system, such as an amount of revenue received from the users as a result of their actions (e.g., transaction fees collected or advertising revenues generated), an amount of user activity generated with respect to the network-based publication system (e.g., viewing pages, sharing content items, or "liking" content items), a number of opportunities to present advertisements, and so on.

Examples of actions that the users may take after entering the search query include placing a bid on an item, purchasing an item, watching a listing of an item (e.g., subscribing to be notified of bids, changes, or other information pertaining to a listing of the item), viewing the listing of the item (e.g., accessing a content page providing information on the item), and so on. In various embodiments, each of the actions that a user may perform with respect to the item may be assigned a significance rating. For example, based on a placing of a bid or a purchasing of an item resulting in transaction fees being collected (e.g., from the seller, buyer, or both), the action of placing a bid or purchasing the item may be assigned a significance rating that reflects the amount of the transaction fees collected. Similarly, if the viewing of a listing of an item by the users results in an amount of advertising revenue being collected, the action of the viewing of the listing of the item may be assigned a significance rating that reflects the amount of advertising revenue. In various embodiments, the significance ratings may then be used to adjust the confidence measures for each of the set of annotations.

At operation 410, the propagation module 356 may propagate the generated sets of annotations and sets of confidence measures to a search engine for use in enhancing search results corresponding to additional search queries. For example, upon receiving an additional search having a similarity or a combination of similarities to a previous search query (as described in more detail below with respect to FIG. 5), the search engine may project the set of annotations and the set of confidence measures onto the additional search query. This projection may enable the search engine to enhance the search results, as described in more detail below.

Figure 5:
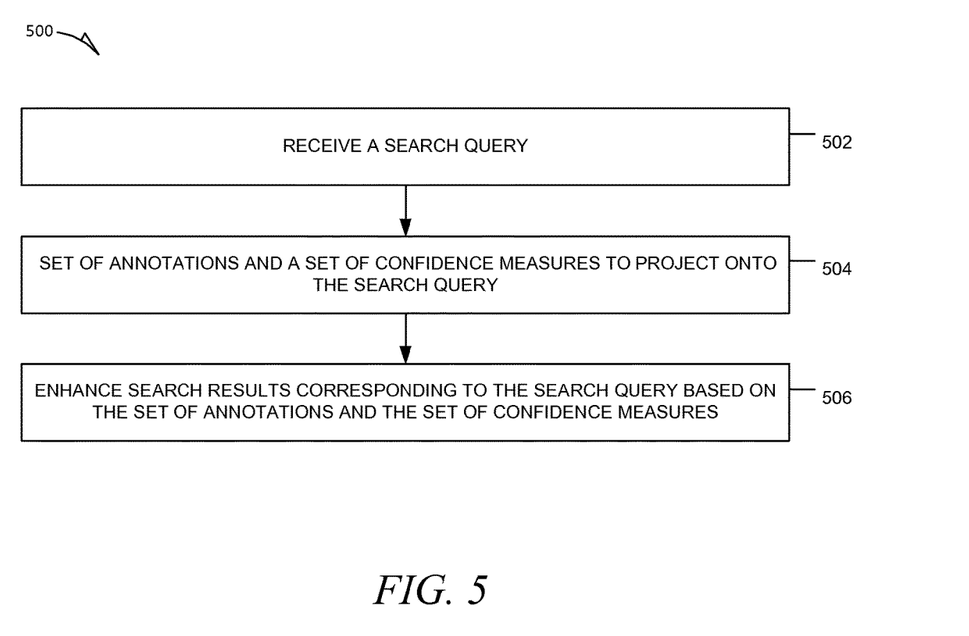
FIG. 5 is a flowchart illustrating example operations of a method of enhancing search results based on the propagation of generated sets of annotations onto a search query.

FIG. 5 is a flowchart illustrating example operations of a method 500 of enhancing search results based on the propagation of generated sets of annotations onto a search query.

In various embodiments, the method 500 may be performed by various modules of the query annotation application(s) 234.

At operation 502, the relevancy module 302 receives a search query. For example, the search query may be received from a user of the network-based publication system who is looking for listings of a particular item.

At operation 504, the relevancy module 302 receives a set of annotations and a set of confidence measure to project onto the search query. For example, in various embodiments, the relevancy module 302 may provide the search query to the query annotation application(s) 234 and, in return, receive the set of annotations and the set of confidence measures corresponding to the query.

In various embodiments, the query annotation application(s) 234 may identify the set of annotations and the set of confidence measures based on a comparison of the search query to previously-submitted search queries and the generated set of annotations and confidence measures corresponding to the previously-submitted queries (e.g., as described above with respect to FIG. 3). For example, in various embodiments, based on the search query being the same as or similar to a previously-submitted search query (e.g., based on a comparison of the keywords included in the queries, lengths of the keywords or lengths of the queries, shapes of the keywords in the queries or shapes of the queries, definitions of the keywords included in the queries, synonyms of the keywords included in the queries, antonyms of the keywords in the queries, a pre-computer representation of the meaning of the words included in the queries, and so on), the query annotation application(s) 234 may project a set of annotations and confidence measures generated for the previously-submitted search query onto the search query.

In various embodiments, a statistical model is trained on a set of previously-submitted queries to identify a characteristic or a combination of characteristics by which a newly submitted search query may be identified as being similar to one or more of the previously-submitted search queries. Thus, through machine learning, annotations generated for previously-submitted search queries that are determined by the statistical model to be the most similar to a newly-submitted search query may be projected onto the newly-submitted search query.

At operation 506, the navigation application(s) 214 may enhance a set of search results corresponding to the search query. For example, the relevancy module 302 may adjust a relevancy of one or more search results corresponding to the search query based on the set of annotations and the set of confidence measures. For example, instead of basing the search results only on comparisons of keywords included in the search query with keywords in a database index corresponding to a listing on the network-based publication system, the relevancy module 302 may use the set of annotations and the set of confidence measures to boost a ranking of one or more search results. For example, based on the search query including the keywords "red" and "Porsche," the navigation application(s) 214 may identify a set of search results corresponding to the search query that includes references to listings on the network-based publication system corresponding to both red Porsche automobiles and paint having a "Porsche" color. However, based on a projection of a set of annotations onto the search query that identify the search query as being associated with Porsche automobiles with a 90% confidence level and paint having a Porsche color with an 8% confidence level, the relevancy module 302 may boost the ranking of search results corresponding to red Porsche automobiles over other search results. Thus, a user submitting the search query may be presented with search result items that are ranked such that items that are most relevant with the respect to the network-based publication system are listed closer to the top of the list of search results items.

Similarly, based on the confidence level of each annotation, the expansion module 304 may limit the expansion or increase the expansion of search results pertaining to the keywords in the query. Thus, for example, instead of expanding the search results to include listings of items having the color "red," including search results not referring to listings of automobiles and paint, the expansion module 304 may limit the search result items to listings of automobiles and paint. Or, alternatively, the search results may be further expanded to included items having synonyms of red in their titles or descriptions. Thus, for example, when annotations match particular search results with a high confidence (e.g., based on a predetermined confidence threshold), rather than being presented with a longer list of search results that includes items that are likely to be irrelevant, the user will be presented with a shorter list of search results that includes references of listings to items that are most likely to be relevant. On the other hand, when the annotations match the search results with a lower confidence, the search results may be expanded to include references to additional items.

Figure 6:
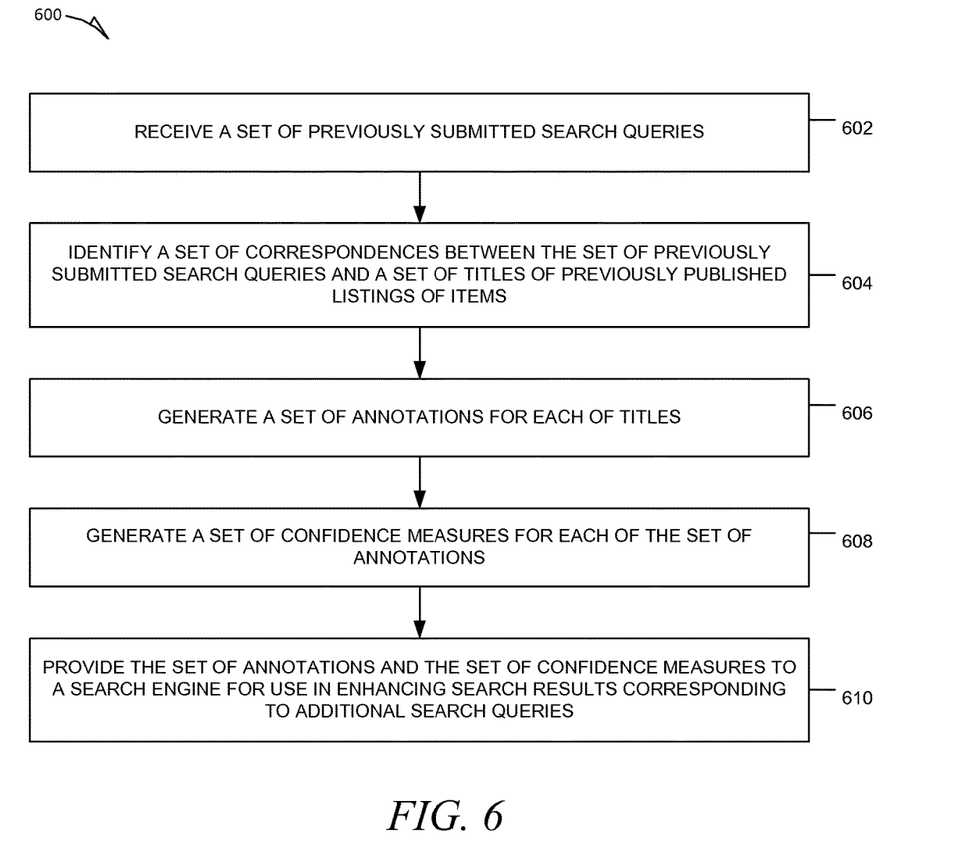
FIG. 6 is a flowchart illustrating example operations of a method of enhancing search results corresponding to a search query based on analysis of previously-submitted search query with respect to titles of listings of items corresponding to the previously-submitted search queries.

FIG. 6 is a flowchart illustrating example operations of a method 600 of enhancing search results corresponding to a search query based on analysis of previously-submitted search query with respect to an element of listings (e.g., titles of listings) of items corresponding to the previously-submitted search queries. In various embodiments, the method 600 may be performed by various modules of the query annotation application(s) 234.

At operation 602, the association module 352 receives a set of previously-submitted search queries. In various embodiments, the previously-submitted search queries are search queries that were previously submitted by users who were searching for listings of items on the network-based publication system.

At operation 604, the association module 352 identifies a set of correspondences between the set of previously-submitted search queries and a set of titles of previously-published listings of items. In various embodiments, the identifying of the correspondence is based on an analysis of user behavior with respect to a set of previously-generated search results corresponding to the set of previously-submitted search queries (e.g., as described above with respect to FIG. 4).

At operation 606, the annotation module 354 generates a set of annotations corresponding to the set of titles of the previously-published listings of items. In various embodiments, the generating of the set of annotations is based solely on analysis of the titles, including the keywords included in the titles, the order of the keywords in the titles, the relationship between keywords included in the titles, and so on. In various embodiments, embodiments, the set of annotations may be based on additional information associated with the listing, including information provided by the seller when listing the item (e.g., a product description, price, photo, and so on), metadata (e.g., date or time of listing), user behavior associated with the listing (e.g., listing views, bids, watches, and so on).

At operation 608, the annotation module 354 generates a set of confidence measures to associate with the each of the set of annotations. In various embodiments, the confidence measures are determined based on a strength of a correspondence between activities performed by the user with respect to the listings (e.g., as described above with respect to FIG. 3).

At operation 610, the propagation module 356 provides the set of annotations and the set of confidence measures to a search engine for use in enhancing search results corresponding to additional search queries received (e.g., at run time). In various embodiments, the search results are enhanced to boost relevancy of particular results or to limit expansion of the search results, as described above with respect to FIG. 5. In other words, upon receiving a newly-submitted query, the navigation application(s) 214 may invoke the query annotation application(s) 234 to tag the newly-submitted query with appropriate annotations (e.g., based on an application of a statistical model corresponding to the annotations of previously-submitted queries, as described above). The annotated query may then be passed back to the navigation application(s) to refine the search results corresponding to the newly-submitted query, as described in more detail above.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
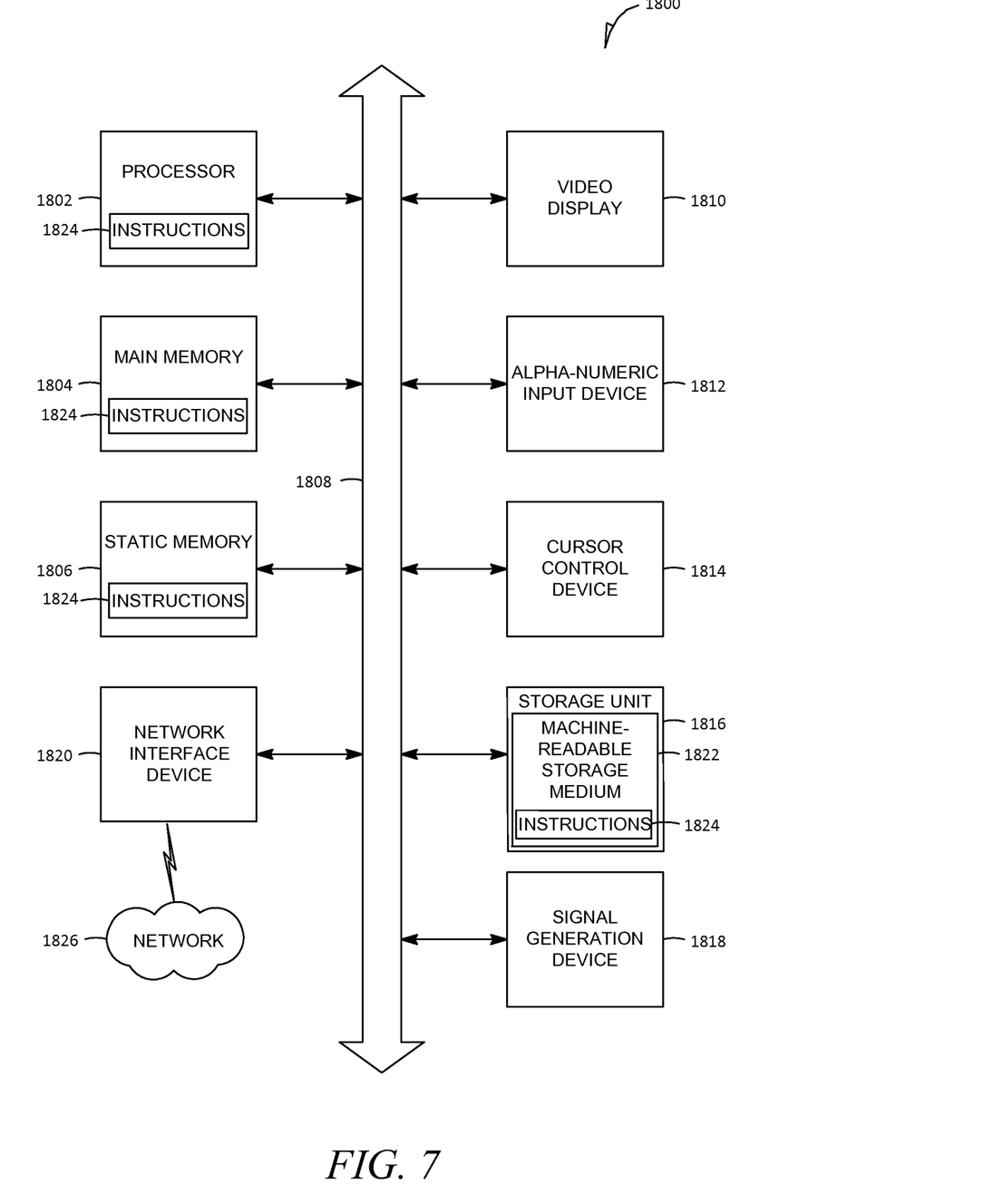
FIG. 7 is a block diagram of machine in the example form of a computer system within which instructions for causing the machine to perform any one or more of the methodologies discussed herein may be executed.

FIG. 7 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining a strength of a correspondence between a search query and a title of a listing of an item on a network-based publication system, the search query including a keyword, the determining of the strength of correspondence based on an analysis of a set of actions previously taken by a set of users after submitting a set of previous search queries including the keyword;
   generating a set of annotations corresponding to the search query, the generating including identifying a type of the item and a confidence measure pertaining to the identifying of the type of the item;
   propagating the set of annotations to a search engine for use in enhancing search results generated by the search engine; and
   presenting the enhanced search results generated by the search engine, the enhanced search results including a filtering of the search results based on the type of the item and the confidence measure.

2. The method of claim 1, wherein the strength of the correspondence is based on an amount of revenue associated with the set of actions by the set of users who submitted the search query.

3. The method of claim 1, wherein the strength of the correspondence is based on rankings of types of the set of actions, the types of the set of actions including viewing the listing of the item, watching the listing of the item, bidding on the item, or purchasing the item.

4. The method of claim 1, wherein the generating of the set of annotations corresponding to the title includes generating an annotation identifying a value of a property of the item.

5. The method of claim 1, wherein the enhancing of the search results includes reducing an expansion of the search results based on the strength of the correspondence transgressing a strength threshold.

6. The method of claim 1, wherein the enhancing of the search results includes increasing a relevancy of a search result item by an amount based on the set of annotations propagated to the search query.

7. The method of claim 6, further comprising determining the amount based on the strength of the correspondence.

8. A system comprising:
one or more modules implemented by one or more processors, the one or more modules configured to, at least:
determine a strength of a correspondence between a search query and a title of a listing of an item on a network-based publication system, the search query including a keyword, the determining of the strength of correspondence based on an analysis of a set of actions previously taken by a set of users after submitting a set of previous search queries including the keyword;
generate a set of annotations corresponding to the search query, the generating including identifying a type of the item and a confidence measure pertaining to the identifying of the type of the item;
propagate the set of annotations to a search engine for use in enhancing search results generated by the search engine; and
present the enhanced search results generated by the search engine, the enhanced search results including a filtering of the search results based on the type of the item and the confidence measure.

9. The system of claim 8, wherein the strength of the correspondence is based on an amount of revenue associated with the set of actions by the set of users who submitted the search query.

10. The system of claim 8, wherein the strength of the correspondence is based on rankings of types of the set of actions, the types of the set of actions including viewing the listing of the item, watching the listing of the item, bidding on the item, or purchasing the item.

11. The system of claim 8, wherein the generating of the set of annotations corresponding to the title includes generating an annotation identifying a value of a property of the item.

12. The system of claim 8, wherein the enhancing of the search results includes reducing an expansion of the search results based on the strength of the correspondence transgressing a strength threshold.

13. The system of claim 8, wherein the enhancing of the search results includes increasing a relevancy of a search result item by an amount based on the set of annotations propagated to the search query.

14. The system of claim 13, further comprising determining the amount based on. the strength of the correspondence.

15. A non-transitory machine readable medium comprising a set of instructions that, when executed by a processor, causes the processor to perform operations, the operations comprising:
determining a strength of a correspondence between a search query and a title of a listing of an item on a network-based publication system, the search query including a keyword, the determining of the strength of correspondence based on an analysis of a set of actions previously taken by a set of users after submitting a set of previous search queries including the keyword;
generating a set of annotations corresponding to the search query, the generating including identifying a type of the item and a confidence measure pertaining to the identifying of the type of the item;
propagating the set of annotations to a search engine for use in enhancing search results generated by the search engine; and
presenting the enhanced search results generated by the search engine, the enhanced search results including a filtering of the search results based on the type of the item and the confidence measure.

16. The non-transitory machine readable medium of claim 15, wherein the strength of the correspondence is based on an amount of revenue associated with the set of actions by the set of users who submitted the search query.

17. The non-transitory machine readable medium of claim 15, wherein the strength of the correspondence is based on rankings of types of the set of actions, the types of the set of actions including viewing the listing of the item, watching the listing of the item, bidding on the item, or purchasing the item.

18. The non-transitory machine readable medium of claim 15, wherein the generating of the set of annotations corresponding to the title includes generating an annotation identifying a value of a property of the item.

19. The non-transitory machine readable medium of claim 15, wherein the enhancing of the search results includes reducing an expansion of the search results based on the strength of the correspondence transgressing a strength threshold.

20. The non-transitory machine readable medium of claim 15, wherein the enhancing of the search results includes increasing a relevancy of a search result item by an amount based on the set of annotations propagated to the search query.

* * * * *

UNITED STATES PATENT AND TRADEMARK OFFICE
CERTIFICATE OF CORRECTION

PATENT NO.       : 9,824,385 B2
APPLICATION NO.  : 14/584483
DATED            : November 21, 2017
INVENTOR(S)      : Jean-David Ruvini et al.

It is certified that error appears in the above-identified patent and that said Letters Patent is hereby corrected as shown below:

In the Claims

In Column 15, Line 46, in Claim 14, delete "on." and insert -- on --, therefor.

Signed and Sealed this
Eighth Day of May, 2018

Andrei Iancu
*Director of the United States Patent and Trademark Office*